(12) United States Patent
Inomata et al.

(10) Patent No.: US 7,043,282 B2
(45) Date of Patent: May 9, 2006

(54) PORTABLE ELECTRONIC EQUIPMENT AND BATTERY MOUNTING DEVICE OF THE EQUIPMENT

(75) Inventors: Yoji Inomata, Yokohama (JP); Yasunobu Ikeda, Yokohama (JP); Toshihiro Higuchi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 181 days.

(21) Appl. No.: 10/466,448

(22) PCT Filed: Jun. 7, 2002

(86) PCT No.: PCT/JP02/05688

§ 371 (c)(1),
(2), (4) Date: Jul. 16, 2003

(87) PCT Pub. No.: WO03/026040

PCT Pub. Date: Mar. 27, 2003

(65) Prior Publication Data

US 2004/0048638 A1    Mar. 11, 2004

(30) Foreign Application Priority Data

Sep. 14, 2001    (JP) .............................. 2001-279870

(51) Int. Cl.
*H04M 1/00*    (2006.01)

(52) U.S. Cl. ................. 455/575.1; 455/550.1

(58) Field of Classification Search ............. 455/575.1, 455/575.2, 575.4, 575.3, 550.1; 379/433.08; 396/539
See application file for complete search history.

(56) References Cited

U.S. PATENT DOCUMENTS

| 4,972,508 | A  | * | 11/1990 | King ......................... 455/351 |
| 6,515,450 | B1 | * | 2/2003  | Kaiho et al. ................ 320/112 |
| 6,829,495 | B1 | * | 12/2004 | Lee .......................... 455/575.1 |

FOREIGN PATENT DOCUMENTS

| JP | 2000077051 A | * | 3/2000 |
| JP | 2000-151775  |   | 5/2000 |
| JP | 2001-43840   |   | 2/2001 |
| JP | 2001-118552  |   | 4/2001 |
| KP | 10-172527    |   | 6/1998 |

* cited by examiner

*Primary Examiner*—Sonny Trinh
*Assistant Examiner*—Marivelisse Santiago-Cordero
(74) *Attorney, Agent, or Firm*—Pearne & Gordon LLP

(57) ABSTRACT

In order to enable both a back lid and a battery of a mobile electronic apparatus to be locked and unlocked with a single motion, the mobile electronic apparatus (10) in which the battery (11) is housed by opening the back lid (13) has such a structure that when a lock member (21) which is provided in a body of the mobile electronic apparatus so as to slide is slid to a locked position, the lock member (21) simultaneously locks both an engaging part (11a) provided in the battery (11) and an engaging part (13b) provided in the back lid (13), and when the lock member (21) is slid to an unlocked position, the lock member (21) simultaneously unlocks both the engaging parts (11a, 13b).

6 Claims, 7 Drawing Sheets

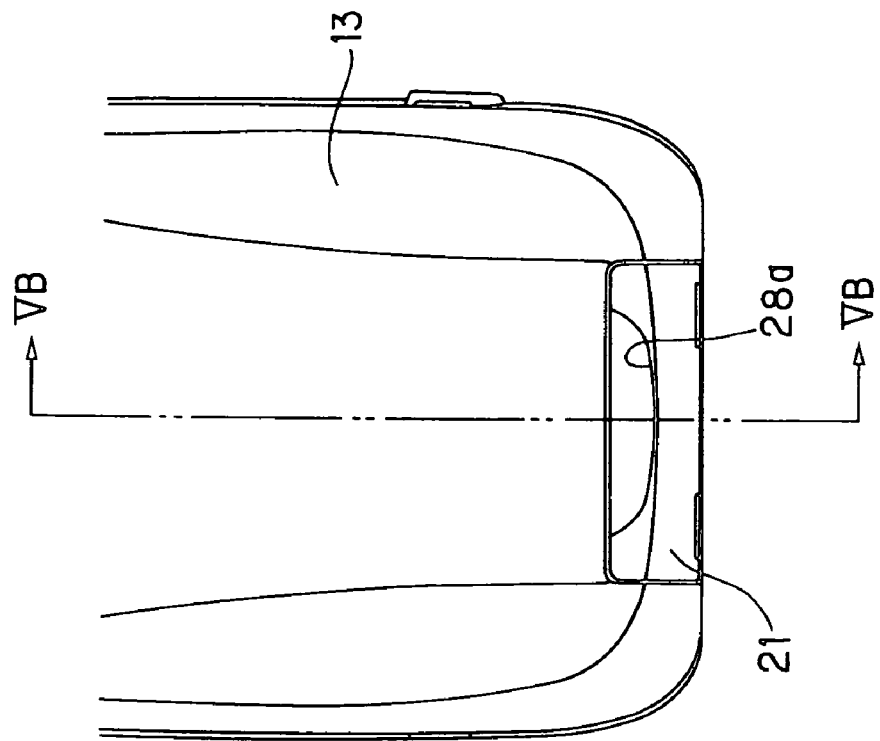
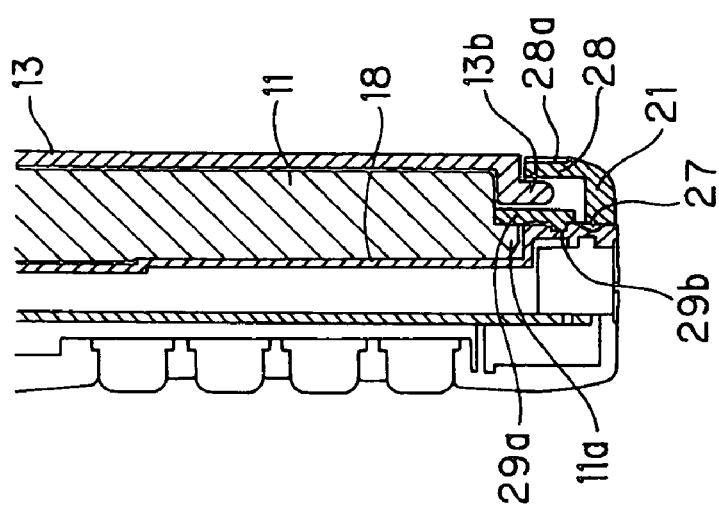
FIG. 5(a)
FIG. 5(b)

PORTABLE ELECTRONIC EQUIPMENT AND BATTERY MOUNTING DEVICE OF THE EQUIPMENT

TECHNICAL FIELD

The present invention relates to a mobile electronic apparatus such as a mobile phone set, and more particularly to a battery installation device for detachably installing a battery in the mobile electronic apparatus, after a lid of the mobile electronic apparatus is opened.

BACKGROUND ART

FIGS. 8, 9 and 10 are views for explaining steps of installing a battery in a conventional battery installation device. A mobile phone set 1 is so designed that a battery 3 is housed in a battery housing part 2 provided in an area where a back lid is opened, and then, the battery housing part is covered with the back lid 4. In the illustrated example, because the battery 3 is heavy, a projection (not shown) provided at a distal end portion of the battery 3 is inserted (in a direction of an arrow mark A in FIG. 8) into a recess (not shown) provided in a body of the mobile phone set 1 to fix the distal end portion, and then, a rearward portion of the battery 3 is received (in a direction of an arrow mark B in FIG. 9) in the battery housing part 2. Thereafter, by sliding a lock member 5 of a sliding type which is provided in the body of the mobile phone set 1 in a direction of an arrow mark C in FIG. 9, a projected portion 3a provided in the rear end portion of the battery 3 (See FIG. 8) is pressed, thereby to lock the battery 3 to the body of the mobile phone set 1.

Thereafter, the back lid 4 is fitted (in a direction of an arrow mark D in FIG. 9) to a back side of the body of the mobile phone set 1, and by sliding the back lid 4 with force in a direction of an arrow mark E in FIG. 10, retaining pieces 4a, 4b which are provided in a projecting manner at a distal end of the back lid 4 formed of resin are flexed and engaged with engaging recesses 6, 7 in the body of the mobile phone set 1, and the back lid 4 is fixed so as not to be easily detached from the body of the mobile phone set 1.

In case where the conventional mobile phone set as described above is dropped, the battery 3 which is locked will not be detached from the body of the mobile phone set 1. However, the back lid 4 may be detached from the body of the mobile phone set 1 with a shock of the drop, because the back lid 4 is simply fitted to the back side of the body and further, the retaining pieces 4a, 4b have been engaged with the engaging recesses 6, 7. There is such a problem that after the back lid 4 is repeatedly fitted and detached, the above described retaining pieces 4a, 4b may be deteriorated, and the back lid 4 will be unable to be fixed to the body of the mobile phone set 1.

Although this problem can be solved by providing a lock mechanism for locking the back lid 4 to the body of the mobile phone set 1, it would be difficult, due to limitations of space, to provide both the lock mechanism for locking the battery 3 and the lock mechanism for locking the back lid 4 in a small casing of the mobile phone set, and this will lead to a rise of production cost. There is a further problem that a work for exchanging the battery is annoying, because the two lock mechanisms must be operated.

In some of the conventional mobile phone set, the back lid is provided with the lock mechanism, and the battery is simply incorporated in the body of the mobile phone set 1. However, such a state that the heavy battery is not locked inside the body of the mobile phone set may have a detrimental effect on reliability of the mobile phone set, and may be unfavorable.

DISCLOSURE OF THE INVENTION

An object of the present invention is to provide a battery installation device which can lock both a back lid and a battery by means of a single operating member, and a mobile electronic apparatus provided with the same.

The mobile electronic apparatus and its battery installation device which can attain the above described object are characterized by having such a structure that on occasion of housing the battery by opening a lid, when a lock member which is provided in a body of the mobile electronic apparatus so as to slide is slid to a locked position, the aforesaid lock member locks both an engaging part provided in the aforesaid battery and an engaging part provided in the aforesaid lid. According to this structure, the lock of the battery and the lock of the lid can be operated by means of a single operating member.

Preferably, the aforesaid lock member is characterized by having such a structure that the lock member simultaneously locks both the engaging part provided in the aforesaid battery and the engaging part provided in the aforesaid lid, when the lock member is slid to the aforesaid locked position, and simultaneously unlocks both the aforesaid engaging parts, when the lock member is slid to an unlocked position. According to this structure, it will be possible to perform both the locking operations with a single motion.

BRIEF DESCRIPTION OF THE DRAWINGS

FIG. 5(a) is a back view of the mobile phone set in a locked position of the battery installation device according to the embodiment of the invention.

FIG. 5(b) is a sectional view of the mobile phone set in the locked position of the battery installation device according to the embodiment of the invention.

Figure 1:
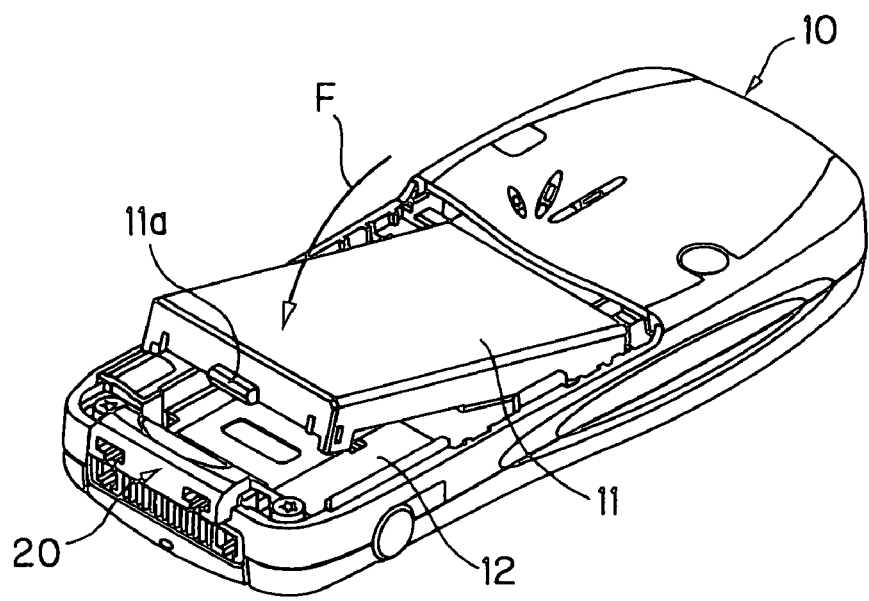
FIG. 1 is a perspective view of a mobile phone set provided with a battery installation device according to an embodiment of the invention, showing a state in which the battery is being installed after a back lid is removed.

It is to be noted that reference numeral 10 in the drawings is a mobile phone set, 11 is a battery, 11a is an engaging projection, 12 is a battery housing part, 13 is a back lid, 13b is an engaging projection, 18 is a case, 18a and 18b are retaining parts, 20 is a battery installation device, 21 is a slide piece, 22 and 23 are rail pieces, 24 and 25 are channels, 26 is a locked position retaining groove, 27 is an unlocked position retaining groove, 28 is an upper plate, 29 is a lower plate, 29a is an elastic piece, 29b is an engaging projection, and 29c and 29d are retaining projections.

BEST MODE FOR CARRYING OUT THE INVENTION

Now, an embodiment of the present invention will be described referring to the drawings.

FIG. 1 is a perspective view of a mobile phone set provided with a battery installation device according to the embodiment of the invention, showing a state in which a battery is being inserted in a battery housing part after a back lid is removed. The body of the mobile phone set 10 in this embodiment is provided on its back side with a recess (not shown) into which a projection (not shown) provided at a distal end of the battery 11 is adapted to be inserted. By inserting the projection at the distal end of the battery 11 into this recess, and tilting a rear end of the battery 11 in a direction of an arrow mark F, the battery 11 is housed in a battery housing part 12 in the mobile phone set 10.

In a rear end portion of the battery 11 to which the present embodiment is applied, an engaging projection 11a to be locked is provided in a projecting manner. Moreover, the mobile phone set 10 is provided, on a back side of its rear end portion, with a battery installation device 20, particulars of which will be described below.

Figure 2:
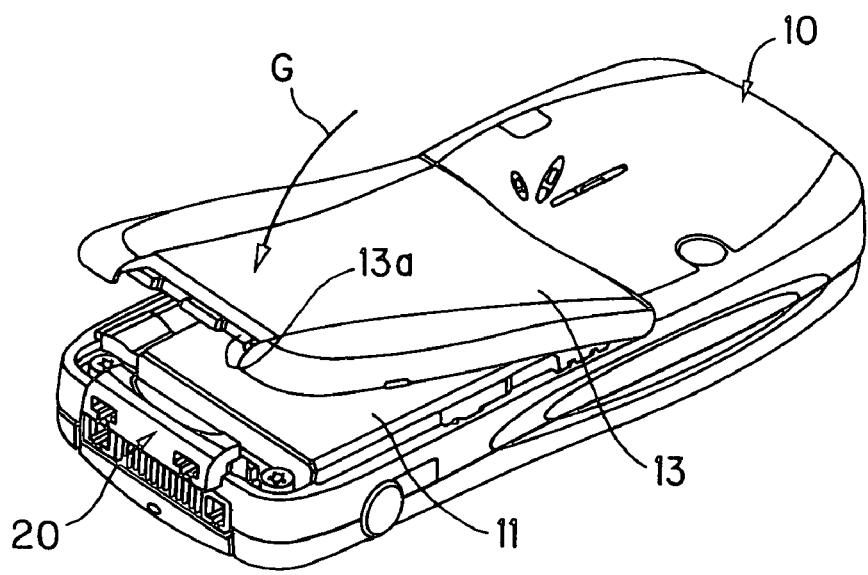
FIG. 2 is a perspective view of the mobile phone set provided with the battery installation device according to the embodiment of the invention, showing a state in which the back lid is being attached.

FIG. 2 is a perspective view of the mobile phone set provided with the battery installation device according to the embodiment of the invention, showing a state in which the back lid is being attached. As has already been described referring to FIG. 1, after the battery 11 is installed on the back side of the mobile phone set 10, a projection provided in a distal end of the back lid 13, which is not shown, is inserted into a recess (not shown) provided in the mobile phone set, and the back lid 13 is tilted in a direction of an arrow mark G, so that the back lid 13 is tightly fitted to the back side of the body of the mobile phone set 10.

At a rear end portion of the back lid 13 to which the present embodiment is applied, there are formed a dented part 13a for receiving a slide piece 21 which constitutes a lock member of the battery installation device 20, particulars of which will be described below, and an engaging projection 13b to be locked which is protruded rearward inside this dented part 13a. This engaging projection 13b is provided at a position overlying on the engaging projection 11a of the battery 11.

Figure 3:
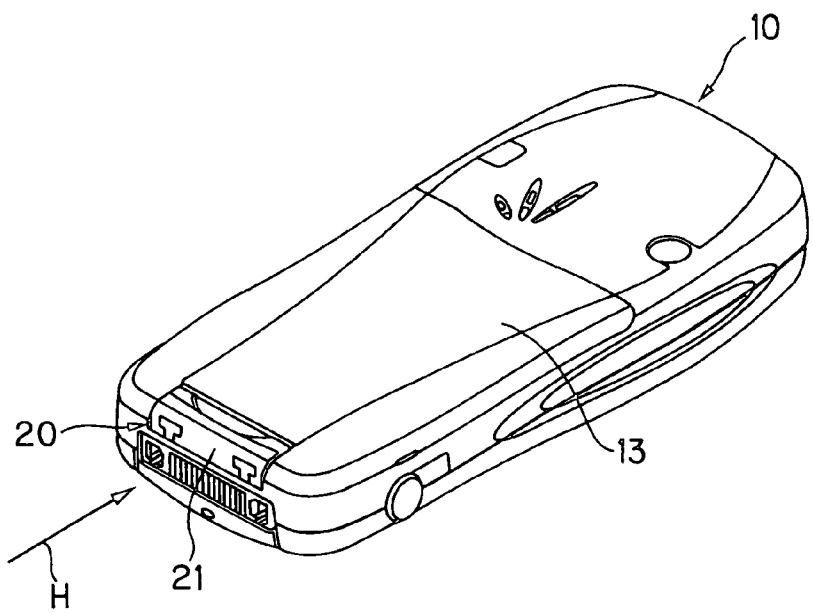
FIG. 3 is a perspective view of the mobile phone set provided with the battery installation device according to the embodiment of the invention, showing a state in which the back lid is attached.

FIG. 3 is a perspective view of the mobile phone set provided with the battery installation device according to the embodiment of the invention, showing a state in which both the back lid and the battery have been simultaneously locked with a single motion. After the back lid 13 is tightly fitted to the back side of the mobile phone 10 as is described referring to FIG. 2, by pushing the slide piece 21 of the battery installation device 20 in a direction of an arrow mark H, the slide piece 21 simultaneously locks the engaging projection 11a of the battery 11 and the engaging projection 13b of the back lid 13, as will be described below in detail.

Figure 4:
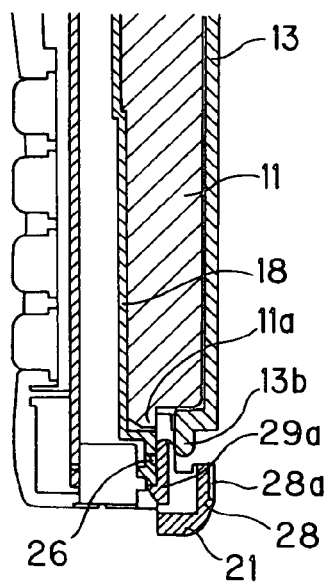
FIG. 4(a) is a back view of the mobile phone set in an unlocked position of the battery installation device according to the embodiment of the invention.
FIG. 4(b) is a sectional view of the mobile phone set in the unlocked position of the battery installation device according to the embodiment of the invention.
Figure 4:
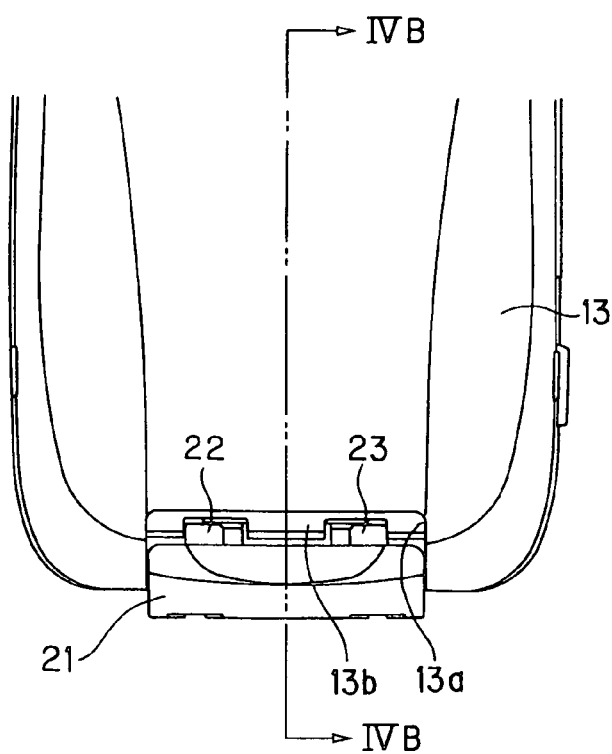
Figure 6:
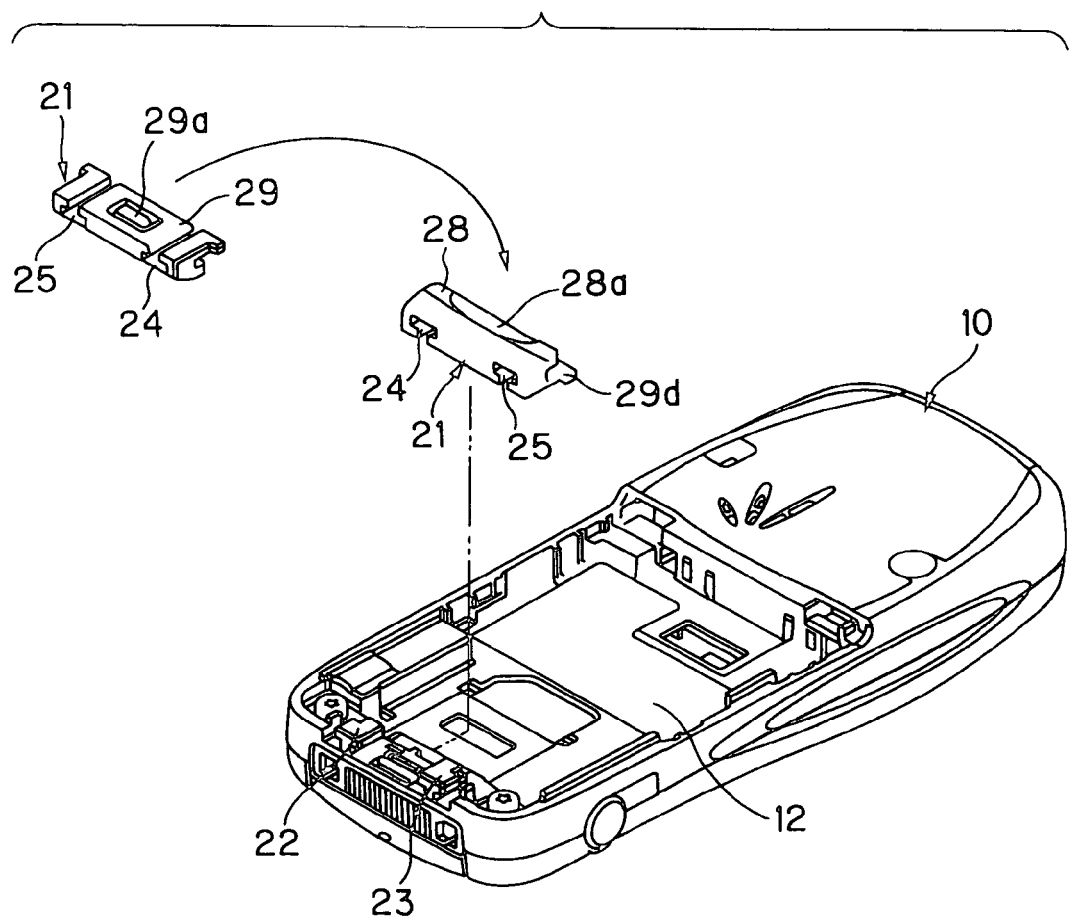
FIG. 6 is an exploded view showing a state in which a slide piece is detached from the mobile phone set provided with the battery installation device according to the embodiment of the invention.
Figure 7:
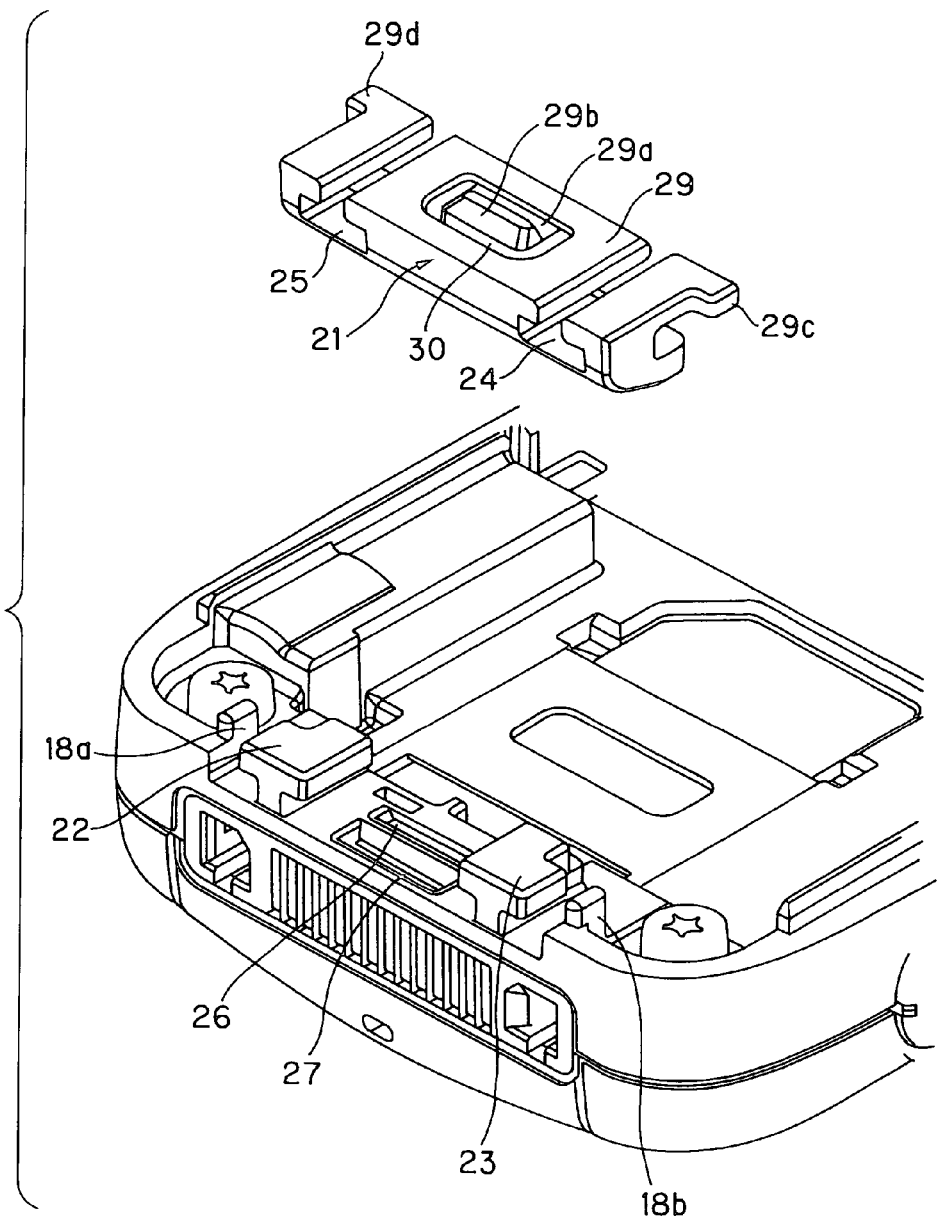
FIG. 7 is an enlarged view of an essential part showing the state in which the slide piece is detached from the mobile phone set provided with the battery installation device according to the embodiment of the invention.
Figure 8:
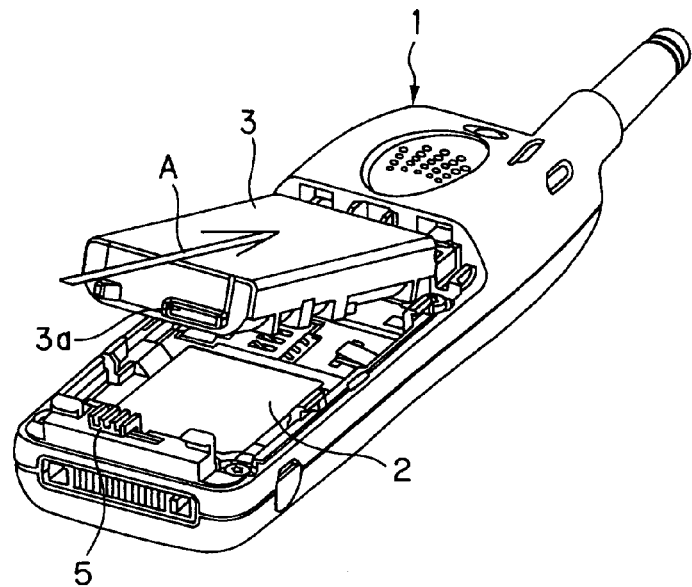
FIG. 8 is a perspective view of a conventional mobile phone set showing a state in which a battery is being installed after a back lid is removed.
Figure 9:
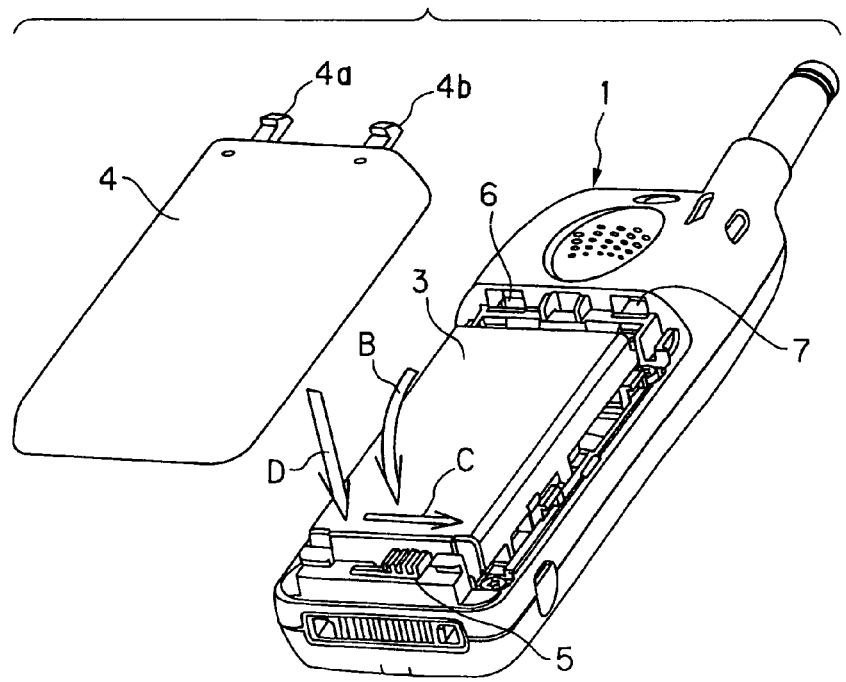
FIG. 9 is a perspective view of the conventional mobile phone set showing a state in which the back lid is being fitted after the battery is installed.
Figure 10:
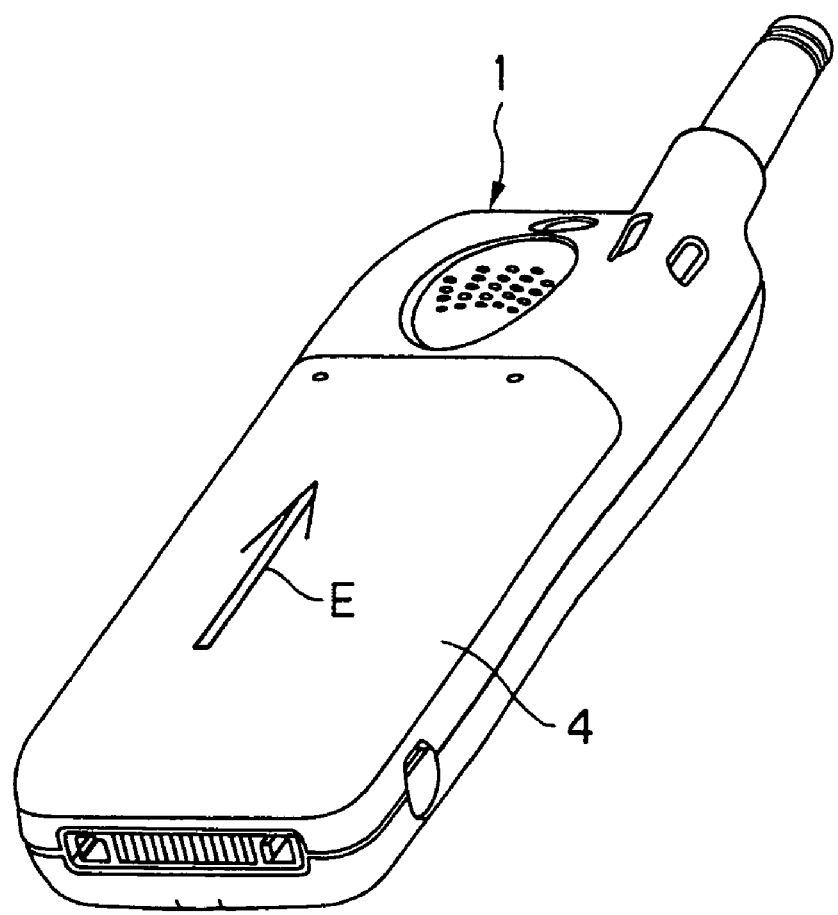
FIG. 10 is a perspective view of the conventional mobile phone set showing the state in which the back lid is being fixed.

Then, referring to FIGS. 4 through 7, particulars of the battery installation device 20 will be described. FIG. 4(a) is a back view of the rear end portion of the mobile phone set 10 in a state where the slide piece 21 is in an unlocked position (lock released position), FIG. 4(b) is a sectional view taken along a line IVB—IVB of FIG. 4(a). FIG. 5(a) is a back view of the rear end portion of the mobile phone set 10 in a state where the slide piece 21 is in a locked position, and FIG. 5(b) is a sectional view taken along a line VB—VB of FIG. 5(a). FIG. 6 is an exploded view showing a state in which the slide piece 21 is detached from the back side of the body of the mobile phone set 10 (Both a front side and a back side of the slide piece 21 are illustrated). FIG. 7 is an enlarged view of an essential part of FIG. 6 (with an enlarged view of the back side of the slide piece 21).

The battery installation device 20 in this embodiment includes two rail pieces 22, 23 having a T-shape in cross section (See FIGS. 6 and 7) which are provided in a projecting manner on a back side of a rear end portion of a case 18 made of ABS resin, for example. The slide piece 21 is formed of polyacetal resin, for example, and provided with channels 24, 25 having a T-shape in cross section with which the above mentioned rail pieces 22, 23 are adapted to be engaged. In a state where the slide piece 21 is mounted on the rail pieces 22, 23, the slide piece 21 is attached so as to slide in a direction along the rail pieces 22, 23 (in a direction of an arrow mark H in FIG. 3), and so as not to be withdrawn from the rail pieces 22, 23 (A structure for restraining the slide piece 21 from being withdrawn will be described below).

Although the slide piece 21 is allowed to slide in the direction along the rail pieces 22, 23, a locked position retaining groove 26 and an unlocked position retaining groove 27 are provided between the rail piece 22 and the rail piece 23 of the case 18, for the purpose of retaining the slide piece 21 at the two positions, namely, the locked position and the unlocked position.

The slide piece 21 has two plates, namely, an upper plate 28 and a lower plate 29 (See FIGS. 4, 5 and 7). An elastic piece 29a of a cantilever type is formed in the lower plate 29 by forming a cut-in 30 in a C-shape, and at an underside of a distal end of this elastic piece 29a, a projection 29b which is adapted to be elastically engaged with the above mentioned locked position retaining groove 26 and the unlocked position retaining groove 27 is provided in a projecting manner.

Opposite ends of the lower plate 29 of the slide piece 21 are respectively provided with retaining projections 29c, 29d. When this slide piece 21 which is attached to the rail pieces 22, 23 tends to move in a direction away from the mobile phone set 10 beyond the unlocked position, these retaining projections 29c, 29d interfere with retaining parts 18a, 18b which are provided in the case 18 of the mobile phone set 10, so as to restrain the slide piece 21 from being withdrawn. These retaining parts 18a, 18b are in such a shape that they are slightly projected upwardly (toward the back lid) in order to ensure the retaining projections 29c, 29d to be retained, even though the slide piece 21 is flexed with a strong force.

When the slide piece 21 is pushed into the locked position, an end of the lower plate 29 of the slide piece 21 adjacent to the battery 11 presses an upper face side (the back lid side) of the engaging projection 11a of the battery 11 thereby to lock the battery 11, and simultaneously, an end of the upper plate 28 of the slide piece 21 adjacent to the battery 11 presses an upper face side of the engaging projection 13b of the back lid 13 thereby to lock the back lid 13. The upper face of the upper plate 28 is formed on the same plane as the front face of the back lid 13, and at the same time, provided with a dent 28a so as to be hooked with a finger nail, in order to bring the slide piece 21 into the unlocked position.

When the battery 11 is to be exchanged in the mobile phone set 10 provided with the battery installation device 20 having the above described structure, the finger nail is hooked on an end of the dent 28a of the upper plate 28 of the slide piece 21 in a state as shown in FIG. 5, and the slide piece 21 is withdrawn away from the battery 11. With this motion, the projection 29b at the distal end of the elastic piece 29a is detached from the groove 26 and moves toward the groove 27 to be brought into a retained state at this position. Even though the slide piece 21 is forced to be withdrawn beyond this position, the slide piece 21 is unable to be withdrawn, since the projections 29c, 29d projecting from both sides of the slide piece 21 will strike the retaining parts 18a, 18b of the case 18.

In this state, the engagement between the upper plate 28 of the slide piece 21 and the engaging projection 13b of the back lid 13 is released, and at the same time, the engagement between the lower plate 29 of the slide piece 21 and the engaging projection 11a of the battery 11 is released. Accordingly, it will be possible to easily detach the back lid 13 and the battery 11 from the mobile phone set 10.

After the battery 11 is exchanged, a new battery 11 and the back lid 13 are attached as is described referring to FIGS. 1 and 2. In this manner, the state as shown in FIG. 4 will be attained. In this state, when the slide piece 21 is pushed in to approach the battery 11, the projection 29b at the distal end of the elastic piece 29a of the slide piece 21 is detached from the groove 27 and moves toward the groove 26 to be brought into the retained state at this position. This is the state which is shown in FIG. 5, and the battery 11 and the back lid 13 are simultaneously brought into the locked state with a single motion of the slide piece 21. This locked state will never be released with a shock of such an extent that the mobile phone set 10 is dropped.

As described above, in the mobile phone set provided with the battery installation device in the present embodiment, the battery and the back lid can be simultaneously locked and unlocked by means of the same slide piece with a single motion. Consequently, the reliability of the mobile phone set can be enhanced at a low cost, and at the same time, the battery installation device can be mounted in a small space.

Further, although the projections 11a, 13b as the parts to be locked are provided on the battery and the back lid, it would be possible to lock the battery and the back lid 13, by providing recesses instead of the projections as the parts to be locked, and by providing projections to be engaged with these recesses on the slide piece 21.

Although the present invention is described in detail referring to the specified embodiment, it would be apparent to those skilled in the art that various changes and modifications can be added to the invention, without departing from spirit and scope of the invention.

The present application is based on Japanese Patent Application (Application No. 2001-279870) filed on Sep. 14, 2001, the contents of which are hereby incorporated by reference.

INDUSTRIAL APPLICABILITY

According to the present invention, it is possible to provide the battery installation device which can lock and unlock both the battery and the back lid by means of a single operating member, at a low cost, and with saving of space.

The invention claimed is:

1. A battery installation device for a mobile electronic apparatus in which a battery is housed by opening a lid comprising:
    at least one restraining piece provided on a body portion of the mobile electronic apparatus;
    a retaining piece including a locked position retaining section and an unlocked position retaining section provided on the body portion of the mobile electronic apparatus adjacent to the restraining piece; and
    a locking member coupled to the restraining piece and adapted to be retained in a locked position when engaged with the locked position retaining section and retained in an unlocked position when engaged with the unlocked position retaining section,
    wherein when the locking member is slid to the locked position, said locking member locks both an engaging part provided in said battery and an engaging part provided in said lid.

2. The battery installation device of a mobile electronic apparatus as claimed in claim 1, wherein
    said locking member simultaneously locks both the engaging part provided in said battery and the engaging part provided in said lid when said locking member is slid to said locked position; and
    said locking member simultaneously unlocks both the engaging parts when said locking member is slid to said unlocked position.

3. The battery installation device of a mobile electronic apparatus as claimed in claim 1, wherein said locking member is adapted to be retained by the restraining piece when said locking member is in the unlocked position.

4. The battery installation device of a mobile electronic apparatus as claimed in claim 1, wherein said locking member comprises at least one retaining projection and said restraining piece comprises at least one retaining part adapted to engage and retain said retaining projection when said locking member is in the unlocked position.

5. The battery installation device of a mobile electronic apparatus as claimed in claim 1, wherein said restraining piece comprises at least one rail piece provided in a projecting manner and said locking member comprises at least one channel piece adapted to be slidably engaged with said rail piece.

6. The battery installation device of a mobile electronic apparatus as claimed in claim 1, wherein said locked position retaining section comprises a locked retaining groove, said unlocked position retaining section comprises an unlocked retaining groove, and said locking member comprises a projection piece adapted to be engaged with one of said locked retaining groove and said unlocked retaining groove.

* * * * *